US010782510B2

(12) United States Patent
Mori et al.

(10) Patent No.: US 10,782,510 B2
(45) Date of Patent: Sep. 22, 2020

(54) PROJECTION SYSTEM AND PROJECTOR WITH LIGHT-SHIELDING MASK

(71) Applicant: SEIKO EPSON CORPORATION, Tokyo (JP)

(72) Inventors: Takateru Mori, Matsumoto (JP); Shuji Narimatsu, Hokuto (JP); Koji Shiokawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/305,424

(22) PCT Filed: May 23, 2017

(86) PCT No.: PCT/JP2017/019169
§ 371 (c)(1),
(2) Date: Nov. 29, 2018

(87) PCT Pub. No.: WO2017/208899
PCT Pub. Date: Dec. 7, 2017

(65) Prior Publication Data
US 2019/0361208 A1    Nov. 28, 2019

(30) Foreign Application Priority Data

May 31, 2016 (JP) ................................ 2016-108268

(51) Int. Cl.
*G02B 13/16* (2006.01)
*G02B 5/00* (2006.01)
(Continued)

(52) U.S. Cl.
CPC .............. *G02B 13/16* (2013.01); *G02B 5/00* (2013.01); *G02B 5/003* (2013.01); *G02B 13/00* (2013.01);
(Continued)

(58) Field of Classification Search
CPC ........ G02B 13/16; G02B 5/003; G02B 13/00; G02B 5/00; G03B 21/14; G03B 21/00; H04N 5/7416
See application file for complete search history.

(56) References Cited

U.S. PATENT DOCUMENTS 6,896,375 B2    5/2005    Peterson et al.
7,009,765 B2    3/2006    Gohman
(Continued)

FOREIGN PATENT DOCUMENTS

CN    101546107 A    9/2009
JP    5266642 B2    8/2013
(Continued)

*Primary Examiner* — Michelle M Iacoletti
*Assistant Examiner* — Magda Cruz
(74) *Attorney, Agent, or Firm* — Oliff PLC

(57) ABSTRACT

A projector projects image light generated by an image generation unit, as an enlarged image via a projection system. The incident position of the image light on the projection system is moved by a lens shift mechanism. The projection system forms an intermediate image in the course of the optical path. A light-shielding mask is provided at an image forming position of the intermediate image. A light-shielding area by the light-shielding mask includes an area that does not overlap the intermediate image within a range of an effective image forming area at the image forming position of the intermediate image. For example, the light-shielding area is an area on the side opposite to the side to which the intermediate image is shifted, of the effective image forming area.

16 Claims, 6 Drawing Sheets

(51) Int. Cl.
  *G03B 21/14* (2006.01)
  *H04N 5/74* (2006.01)
  *G03B 21/00* (2006.01)
  *G02B 13/00* (2006.01)

(52) U.S. Cl.
  CPC .............. *G03B 21/00* (2013.01); *G03B 21/14* (2013.01); *H04N 5/7416* (2013.01)

(56) References Cited

U.S. PATENT DOCUMENTS

| | | |
|---|---|---|
| 7,090,354 B2 | 8/2006 | Engle et al. |
| 7,150,537 B2 | 12/2006 | Peterson et al. |
| 7,175,287 B2 | 2/2007 | Gohman |
| 7,413,312 B2 | 8/2008 | Engle et al. |
| 9,217,912 B2 | 12/2015 | Peterson et al. |
| 9,429,826 B2 | 8/2016 | Peterson et al. |
| 2004/0257539 A1* | 12/2004 | Peterson ................ G03B 21/06 353/69 |
| 2009/0103175 A1* | 4/2009 | Weber ................ G02B 21/0032 359/385 |
| 2009/0244498 A1 | 10/2009 | Matsubara et al. |
| 2015/0042965 A1 | 2/2015 | Peterson et al. |
| 2015/0234157 A1 | 8/2015 | Ichimura |
| 2016/0178878 A1* | 6/2016 | Liu ................... G02B 13/0095 359/364 |
| 2016/0246035 A1 | 8/2016 | Amano |
| 2016/0341943 A1 | 11/2016 | Peterson et al. |
| 2016/0342075 A1 | 11/2016 | Peterson et al. |
| 2018/0173088 A1* | 6/2018 | Minefuji ................ G02B 13/18 |

FOREIGN PATENT DOCUMENTS

| | | |
|---|---|---|
| JP | 2015-152764 A | 8/2015 |
| JP | 2016-143032 A | 8/2016 |
| JP | 2016-156982 A | 9/2016 |

* cited by examiner

PROJECTION SYSTEM AND PROJECTOR WITH LIGHT-SHIELDING MASK

BACKGROUND

1. Technical Field

The present invention relates to a projection system, and a projector which projects an image or the like, using a projection system.

2. Related Art

Traditionally, a projector which projects an image generated using a liquid crystal light valve and a digital micromirror device (DMD) or the like, as an enlarged image on a screen via a projection system, is used. Japanese Patent No. 5266642 (Document 1) discloses a projector of this type (front-projection display device). In the front-projection device of Document 1, a DMD is used as an image generation unit, and a projection system has a relay lens group and a wide-angle lens group. Image light emitted from the DMD travels through a prism, enters the relay lens group, has its optical path bent by 90 degrees by an intermediate prism, and subsequently enters the wide-angle lens group. The image light emitted from the wide-angle lens group is corrected so that an image without any distortion can be displayed even if the image light enters the screen at a steep angle.

In a short throw projector which widens the angle of image light and projects the image light on a screen at a short projection distance via a projection system, a so-called optical shift system which shifts incident image light from an image generation unit into a specific direction with respect to the optical axis of the projection system may be used. In the case where the optical shift system is used, restraining a distortion of the image is a problem to be solved. Therefore, a projection system configured to form an intermediate image in the course of the optical path is used.

In the case where the optical shift system is used, the image light passes through a position that is off the optical axis. Therefore, if a part or the entirety of the projection system is made up of a replacement lens unit, an unintended site may be irradiated with light at the time of replacement and this may cause damage to the lens unit and peripheral components. For example, if the light source remains on in the state where the position of the lens unit is temporarily shifted at the time of replacement, unlike in normal use, vignetting of light beams occurs inside the lens unit. In such cases, damage may occur at a site having a high temperature due to the irradiation with the light.

An advantage of some aspects of the invention is to reduce damage due to unwanted light that passes through the projection system.

SUMMARY

According to the invention, a projection system which is removably installed in a projector having an image generation unit and on which light emitted from the image generation unit enters includes a first optical system which forms an intermediate image, a light-shielding mask provided at an image forming position of the intermediate image, and a second optical system which projects the intermediate image as an enlarged image. A light-shielding area by the light-shielding mask includes an area that does not overlap the intermediate image within a range of a circular effective image forming area centered on an optical axis of the first optical system at the image forming position.

In this way, the projection system of the invention forms an intermediate image in the course of the optical path and cuts off unwanted light at the image forming position of the intermediate image by the light-shielding mask. Thus, a distortion of an image in a short throw projector which projects a wide-angled image at a short projection distance can be restrained, and unwanted light can be effectively cut off. Therefore, a reduction in the quality of the image due to unwanted light can be restrained. Also, there is little risk of damage due to the irradiation of components of the projection system and its peripheral components or the like with unwanted light.

In the invention, it is preferable that the second optical system has a plurality of lenses, that at least a lens on a most enlarging side, of the plurality of lenses, has a substantially arcuate outer shape on one side in a direction orthogonal to an optical axis of the second optical system and has a substantially arcuate outer shape that is partly missing on the other side, and that the intermediate image is formed at a position shifted from the center of the effective image forming area when substantially all of the light enters the lenses except the missing part of the lens on the most enlarging side. Since the part that is not used is cut off, lighter weight and lower cost of the lens can be achieved. Also, it is possible to restrain a temperature rise due to light becoming incident on the cut-off area of the lens and striking the lens barrel or the like as the position of the replacement lens unit forming the projection system goes off the display range. Thus, there is little risk of the lens unit being damaged.

In the invention, it is preferable that the light-shielding area includes an area on the side opposite to the side to which the intermediate image is shifted, within the range of the effective image forming area. In this way, in the case where the optical shift system is employed, the area on the side opposite to the side where the intermediate image shifts is shielded from light. Thus, unwanted light can be cut off efficiently, using the light-shielding mask with a simple shape.

In the invention, it is preferable that the side to which the intermediate image is shifted from the center of the effective image forming area at the image forming position is one side in a first direction orthogonal to the optical axis of the first optical system, that a direction orthogonal to the optical axis of the first optical system and the first direction is a second direction, and that the light-shielding area is an area surrounding the other side in the first direction of the intermediate image and both sides in the second direction of the intermediate image, within the range of the effective image forming area. In this way, unwanted light can be cut off in three directions surrounding the intermediate image. Thus, the majority of the unwanted light can be cut off.

The second optical system has at least one resin lens. Using the resin lens, it is possible to easily prepare an aspheric lens, easily prepare a lens with a non-circular outer shape, and also achieve lighter weight of the projection system. Also, even if the position of the projection system goes off the display range, the light that is off the display range is blocked before the resin lens. Therefore, a temperature rise in the resin lens due to the irradiation of the lens barrel or the like around the resin lens with unwanted light can be restrained. Thus, there is little risk of the resin lens being damaged.

In the invention, the light-shielding mask has a shape along a plane perpendicular to the optical axis. Thus, the shape of the light-shielding mask can be simplified.

In the invention, the light-shielding mask has a shape that follows a field curvature of the intermediate image. For example, a light-shielding film formed on a surface of the lens situated on the nearest side to the image in the first optical system is used as the light-shielding mask. Thus, the light-shielding area can be set, following the field curvature. Therefore, the light-shielding area can be set along the contour of the intermediate image. Thus, the image emitted from the projection system can be sharpened and a reduction in the quality of the projected image can be restrained.

According to the invention, a projector includes: an image generation unit; the projection system, on which light emitted from the image generation unit enters; and a projection system moving device which moves the projection system in a direction along a plane perpendicular to the optical axis of the first optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of a projection system and a projector to which the invention is applied will be described with reference to the drawings.

Embodiment 1

Overall Configuration

Figure 1:
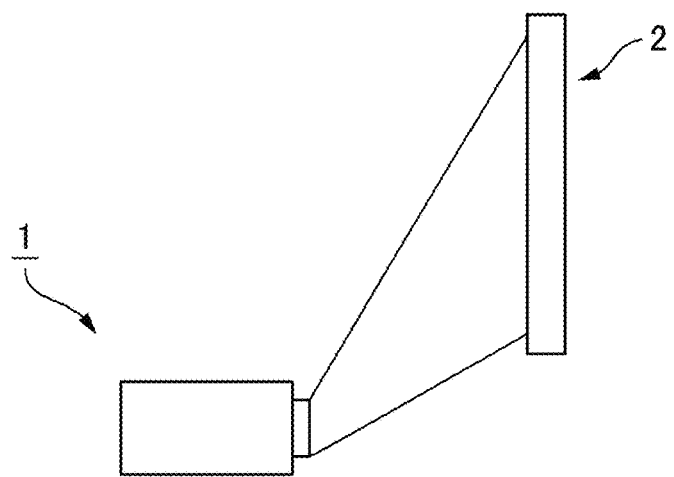
FIG. 1 is an explanatory view schematically showing the state of use of a projector according to Embodiment 1 to which the invention is applied.
Figure 2:
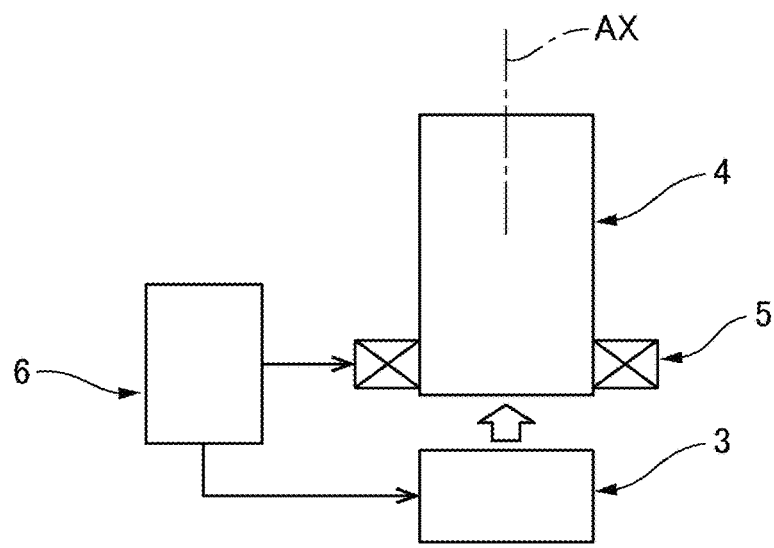
FIG. 2 is an explanatory view schematically showing a schematic configuration of the projector of Embodiment 1.

FIG. 1 is an explanatory view schematically showing the state of use of a projector 1 according to Embodiment 1 to which the invention is applied. FIG. 2 is an explanatory view schematically showing a schematic configuration of the projector 1 according to Embodiment 1. As shown in FIG. 1, the projector 1 according to Embodiment 1 projects image light toward a screen 2. The projector 1 is a short throw projector which generates wide-angled image light, using a lens with a wide angle of view or the like, and projects the generated image light onto the screen at a short projection distance. The image light emitted from the projector 1 can display an image with little distortion even if the image light enters at a steep angle on the screen 2.

As shown in FIG. 2, the projector 1 has an image generation unit 3, a projection system 4, a lens shift mechanism 5, and a control unit 6. In the projector 1, the projection system 4 is removable. These mechanisms are accommodated in an exterior case, not illustrated. Also, the image generation unit 3 and the projection system 4 are accommodated in the exterior case in the state where substantially the entirety of the image generation unit 3 and the projection system 4 is covered with a light guide having a light shielding property, not illustrated.

The image generation unit 3 has a light source and a spatial light modulation device which generates image light, using the light from the light source. As the light source, for example, a LED can be used. In the case of combining light of the three colors of R, G, B to generate image light, LEDs of the three colors of R, G, B are used as the light source. The spatial light modulation device has liquid crystal panels corresponding to the LEDs of the respective colors, and a cross dichroic prism on which the light beams from the respective liquid crystal panels become incident from different directions. The light beams from the LEDs of the three colors become incident on the corresponding liquid crystal panels. Each liquid crystal panel modulates the light from the light source (LED) according to an image signal and emits the modulated light. The R light, the G light, and the B light emitted from the liquid crystal panels are combined by the cross dichroic prism and outputted as image light.

The image generation unit 3 is not limited to the foregoing configuration and can use other configurations. For example, something other than LED may be used as the light source. If a discharge lamp such as an ultra-high-pressure mercury lamp is used as the light source, the light from the light source is split into R light, G light, and B light, using a dichroic mirror or the like. Also, the spatial light modulation device may use a transmission-type liquid crystal or may use a reflection-type liquid crystal. Alternatively, a digital micromirror device (DMD) can be used as the spatial light modulation device.

The projection system 4 is a lens unit made up of a plurality of lenses assembled in a lens barrel, and is removably installed in a lens loading section (not illustrated) of the projector 1 having the image generation unit 3 or the like. That is, the projection system 4 is a replacement lens unit. In this description, the direction of the optical axis of the projection system 4 is denoted by a reference symbol AX (see FIGS. 2 to 4). Also, a direction orthogonal to the optical axis AX is defined as a first direction Y (see FIGS. 3 and 4). A direction orthogonal to the optical axis AX and the first direction Y is defined as a second direction Z (see FIGS. 2 and 4). Also, one side in the first direction Y is defined as a −Y direction and the other side in the first direction Y is defined as a +Y direction. One side in the second direction Z is defined as a +Z direction and the other side in the second direction Z is defined as a −Z direction. Details of the projection system 4 will be described later.

The lens shift mechanism 5 is a projection system moving device which moves the projection system 4 in the first direction Y orthogonal to the optical axis AX. In the projector 1 of Embodiment 1, the lens shift mechanism 5 moves the projection system 4 and thus shifts the incident position of the image light from the image generation unit 3 on the projection system 4, to a specified side from a position centered on the optical axis AX (in this embodiment, in the +Y direction). Also, the lens shift mechanism 5 may be configured to be able to move the projection system 4 in an arbitrary direction within a plane perpendicular to the optical axis AX.

The control unit 6 has a display control unit which controls the image generation unit 3, based on an image signal inputted from outside, and a lens drive control unit or the like which controls the lens shift mechanism 5, based on information of the projection system 4 detected by a detection unit, not illustrated. For example, the control unit 6 detects the ID of the lens unit forming the projection system 4 at various preset timings. Then, based on the detected ID, the control unit 6 can then drive the lens shift mechanism 5 automatically or in response to an operation by the user. If a zoom mechanism and a focusing mechanism which move a part of the lenses forming the projection system 4 along the optical axis AX are provided, the control unit 6 can control these mechanisms to adjust the projection magnification and adjust the focus.

Projection System

Figure 3:
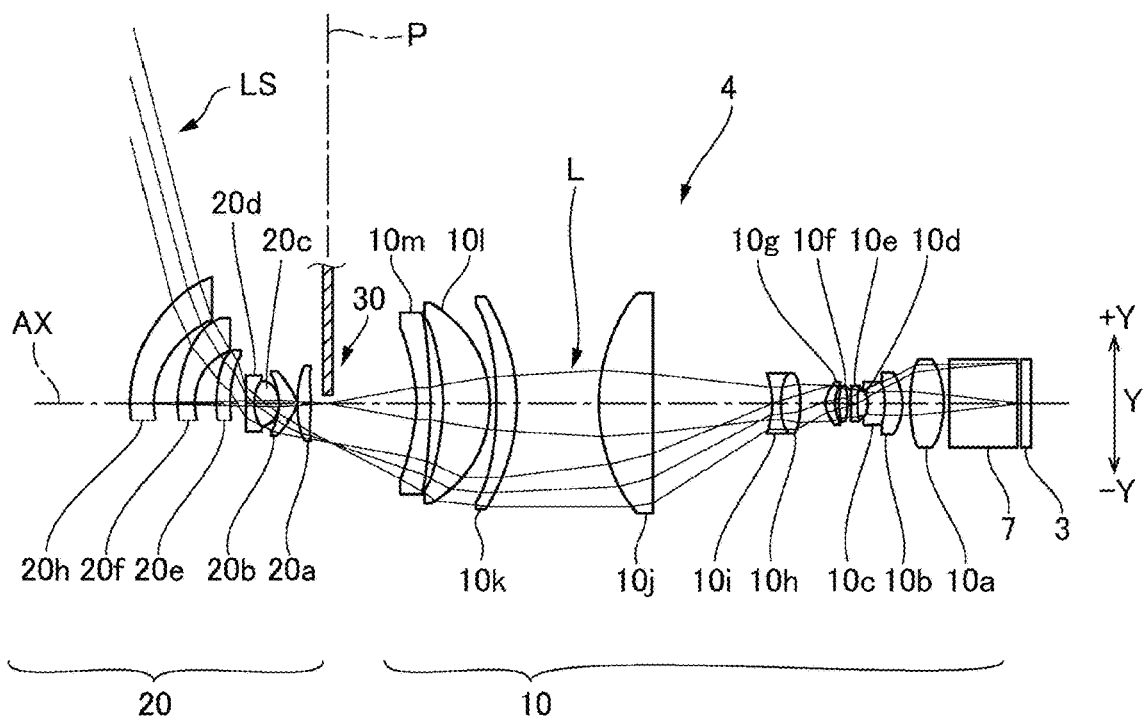
FIG. 3 is a cross-sectional configuration view of a projection system of Embodiment 1.

FIG. 3 is a cross-sectional configuration view of the projection system 4 of Embodiment 1. In FIG. 3, of the image generation unit 3, only the liquid crystal panel for G light and a cross dichroic prism 7 are illustrated. The projection system 4 forms an intermediate image at a halfway position in the optical path. The projection system 4 has a first optical system 10 made up of a lens group situated to the incident side of an image forming position P of the intermediate image, a second optical system 20 made up of a lens group situated to the exiting side of the image forming position P of the intermediate image, and a light-shielding mask 30 arranged at the image forming position P. The first optical system 10 and the second optical system 20 have the same optical axis AX.

In FIG. 3, image light in the state where the incident position of the image light from the image generation unit 3 on the projection system 4 is shifted to a specific side from the optical axis AX of the projection system 4 (in a shifted state) is denoted by a reference symbol LS. Also, image light in the state where the incident position of the image light coincides with the optical axis AX of the projection system 4 (in a non-shifted state) is denoted by a reference symbol L. As shown in FIG. 3, in the shifted state, the exiting direction of the image light LS from the projection system 4 is a direction tilting at a steep angle from the optical axis AX.

As the lens group forming the first optical system 10, lenses 10a, 10b, 10c, 10d, 10e, 10f, 10g, 10h, 10i, 10j, 10k, 10l, and 10m are arranged in this order from the incident side to the exiting side (enlarging side) of the image light. Meanwhile, as the lens group forming the second optical system 20, lenses 20a, 20b, 20c, 20d, 20e, 20f, and 20g are arranged in this order from the incident side to the exiting side (enlarging side) of the intermediate image. The numbers of lenses and the lens shapes of the lens group forming the first optical system 10 and the second optical system 20 are not limited to those shown in FIG. 3 and can be changed suitably according to required characteristics.

Of the lenses 20a to 20g of the second optical system 20, at least the lens on the most enlarging side (exiting side) has a partly missing shape. For example, in this embodiment, the three lenses 20e, 20f, and 20g from the most enlarging side have a partly missing shape. The lenses 20e, 20f, and 20g have a substantially arcuate outer shape on one side in the direction orthogonal to the optical axis AX of the second optical system 20 (in this embodiment, in the +Y direction) and have a substantially arcuate outer shape that is partly missing on the other side (in this embodiment, in the −Y direction). Specifically, the parts of the lenses 20e, 20f, and 20g in the −Y direction are cut off along a straight line. In the shifted state, substantially all of the light enters the lenses except the missing parts of the lenses 20e, 20f, and 20g, and the light does not become incident on the missing parts. The lenses situated on the enlarging side (exiting side) in the projection system 4 have a large lens diameter because of being wide-angled. Therefore, cutting off the unnecessary parts of theses lenses achieves lighter weight and lower cost.

As the lenses forming the first optical system 10 and the second optical system 20, resin lenses made of a resin material such as acrylic can be used. For example, resin lenses can be used as the three lenses 20e, 20f, and 20g cut into substantially semicircular shapes. Using the resin lenses, it is possible to easily prepare aspheric lenses, easily prepare lenses with a non-circular outer shape, and also achieve lighter weight of the projection system 4. The material of the lenses forming the first optical system 10 and the second optical system 20 can be suitably selected according to the required characteristics of the projection system 4. For example, all of the lenses may be made of the same material, or some of the lenses may be made of a different material.

Light Shielding Mask

Figure 4:
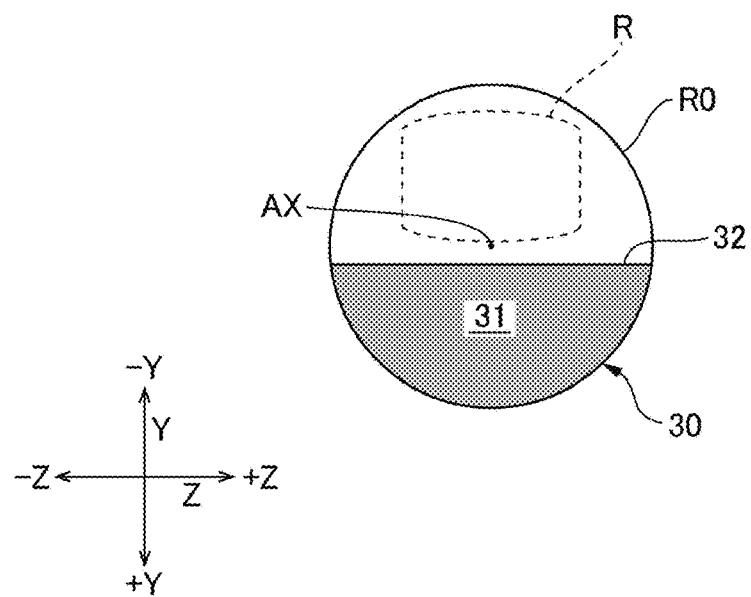
FIG. 4 is an explanatory view of a light-shielding area by a light-shielding mask.

FIG. 4 is an explanatory view of a light-shielding area 31 by the light-shielding mask 30. In FIG. 4, a circular effective image forming area R0 is an image circle at the image forming position P and represents a circular range where the light emitted from the first optical system 10 can form an image at the image forming position P. The light-shielding area 31 by the light-shielding mask 30 includes an area that does not overlap an intermediate image R within the range of the effective image forming area R0 at the image forming position P. In setting the light-shielding area 31, if the intermediate image R in the case of projecting a rectangular image is considered, its shape is such that each side is curved outward as shown in FIG. 4.

As shown in FIG. 3, the image forming area of the intermediate image R in the shifted state is a position shifted in the −Y direction from the optical axis AX (that is, the center of the effective image forming area R0). The area opposite to the side to which the intermediate image R is shifted is a passing area for unwanted light. Therefore, the light-shielding area 31 is set in an area on the side opposite to the side to which the intermediate image R is shifted, of the circular effective image forming area R0. In this embodiment, as shown in FIG. 4, the light-shielding area 31 is a substantially semicircular area situated to the +Y direction side from the intermediate image R, of the circular effective image forming area R0. A boundary 32 between the light-shielding area 31 and the non-light-shielding area is a straight line extending in the second direction Z. If the first direction Y is defined as the direction of image height of image light, the light-shielding area 31 is a passing area for unwanted light in the direction of image height.

The projection size of the intermediate image R at the image forming position P is found, based on the size of the image light emitted from the image generation unit 3 and the projection magnification of the intermediate image R. Therefore, in setting the light-shielding area 31, the position of the boundary 32 can be set, based on the incident position of the image light with a lens shift and the projection magnification of the intermediate image Rat the image forming position P, or the like.

The light-shielding mask 30 is a plate-like component along a plane perpendicular to the optical axis AX. The light-shielding mask 30 may shield only the light-shielding area 31 shown in FIG. 4 or may have a shape extending to the outside of the effective image forming area R0. As the light-shielding mask 30, for example, a metal plate such as aluminum can be used. However, other materials may also be used. The light-shielding mask 30 is held by a lens barrel which holds at least a part of the lenses forming the projection system 4. For example, the light-shielding mask 30 is held by the lens barrel holding the lens group of the first optical system 10. It is desirable that the light-shielding mask 30 has a light absorption property at least on the surface on the incident side (side where the first optical system 10 is situated). Also, if the light-shielding mask 30 is connected with the lens barrel directly or via a highly thermally conductive member, it is possible to radiate the heat generated by the cast light, via the lens barrel. Alternatively, another heat radiation structure may be provided near the light-shielding mask 30.

Principal Advantageous Effects of This Embodiment

In this way, in the projector 1 according to this embodiment, the intermediate image R is formed in the course of the optical path of the projection system 4, and the light-shielding mask 30 cuts off unwanted light at the image forming position P of the intermediate image R. By thus cutting off unwanted light at the position where the intermediate image R is formed, it is possible to efficiently cut off unwanted light. Thus, a reduction in the quality of the image due to unwanted light can be restrained. Also, there is little risk of damage caused by unwanted light being cast on a component in the lens unit forming the projection system 4 and its peripheral components. Moreover, as an empty space is generated at the image forming position P of the intermediate image R, this empty space can be utilized as the installation space for the light-shielding mask 30. Thus, the light-shielding mask 30 can be easily installed and this is advantageous in miniaturizing the projection system 4.

Particularly if the lens on the most enlarging side of the second optical system has a missing part, light strikes the lens barrel in this part and the lens barrel generates heat, causing a temperature rise in the lenses in the peripheries. However, the light-shielding mask cuts off unwanted light and thus can prevent a temperature rise. Also, for this lens, a resin lens is often used for reasons such as the easiness of preparation. For the resin lens, the upper limit of the allowable temperature is low. Therefore, further light shielding by the light shielding mask is needed.

The light-shielding mask 30 in this embodiment has a shape along a plane orthogonal to the optical axis AX. Also, the intermediate image R is formed at a position shifted in the −Y direction from the optical axis AX. The light-shielding area 31 by the light-shielding mask 30 is an area made up of a part situated in the +Y direction from the intermediate image R (that is, to the side opposite to the side to which the intermediate image R is shifted), cut off along a straight line from the circular effective image forming area R0 at the image forming position P. Thus, unwanted light can be efficiently cut off, using the light-shielding mask of a simple shape.

In this embodiment, the projection system 4 is a replacement lens unit that is installable in and removable from the lens loading section of the projector 1 having the image generation unit 3. Therefore, even if a shift or the like in the position of the replacement lens unit occurs, unwanted light is blocked by the light-shielding mask and therefore there is little risk of damage due to light being cast on a component that is not irradiated with light in normal use. For example, there is little risk that different vignetting of light beams from normal use may occur in the replacement lens unit, causing damage to a component irradiated with the light. Therefore, damage to components due to unwanted light can be reduced. Also, it is possible to restrain a temperature rise due to light becoming incident on the cut-off area of the lenses 20e, 20f, and 20g and striking the lens barrel or the like as the position of the replacement lens unit forming the projection system 4 goes off the display range. Thus, there is little risk of the lens unit being damaged.

Modification 1

Figure 5:
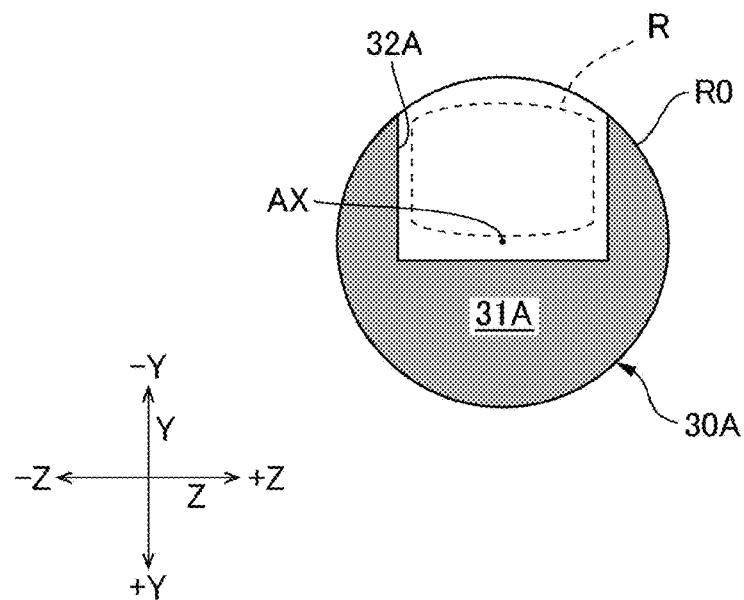
FIG. 5 is an explanatory view of a light-shielding area by a light-shielding mask of Modification 1.

FIG. 5 is an explanatory view of a light-shielding area 31A by a light-shielding mask 30A of Modification 1. In Embodiment 1, only the area in the +Y direction from the intermediate image R is shielded from light, whereas the light-shielding area 31A by the light-shielding mask 30A in Modification 1 is an area covering three directions, that is, the +Y direction side of the intermediate image R (that is, the side opposite to the side to which the intermediate image R is shifted from the center of the effective image forming area R0), and both sides in the second direction Z of the intermediate image R (that is, both sides in the second direction Z orthogonal to the direction of the optical axis AX and the first direction Y), within the range of the effective image forming area R0. The light-shielding area 31A is marked off by a boundary 32A in a recessed shape that is recessed in the +Y direction. Thus, not only unwanted light in the direction of image height but also unwanted light in the direction of image width can be blocked. Therefore, the majority of the unwanted light can be cut off.

Modifications 2 to 4

Figure 6:
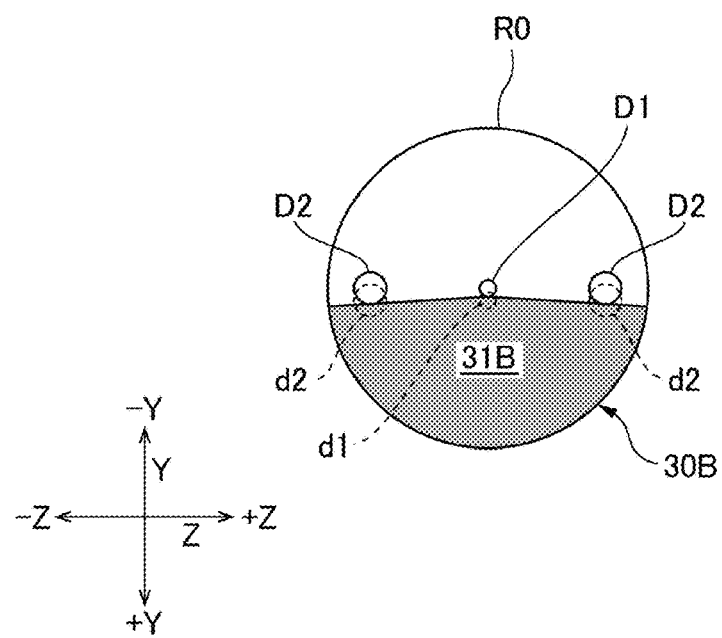
FIG. 6 is an explanatory view of a light-shielding area by a light-shielding mask of Modification 2.
Figure 7:
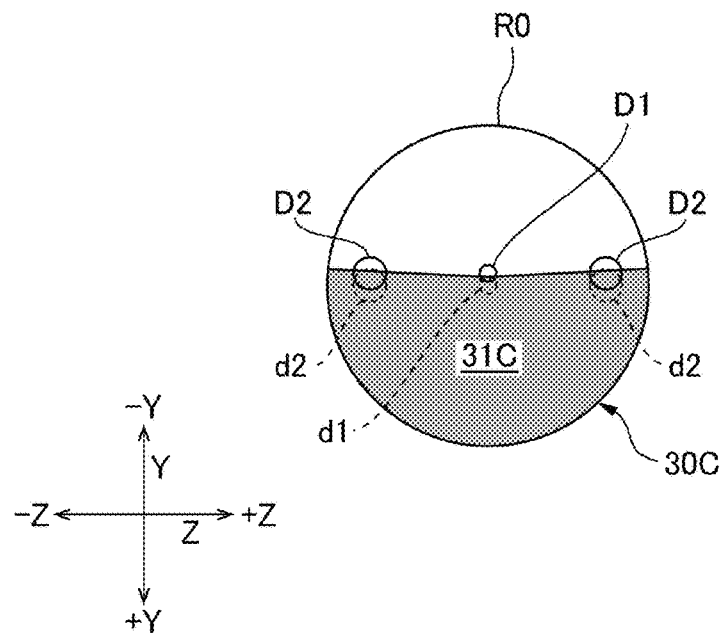
FIG. 7 is an explanatory view of a light-shielding area by a light-shielding mask of Modification 3.
Figure 8:
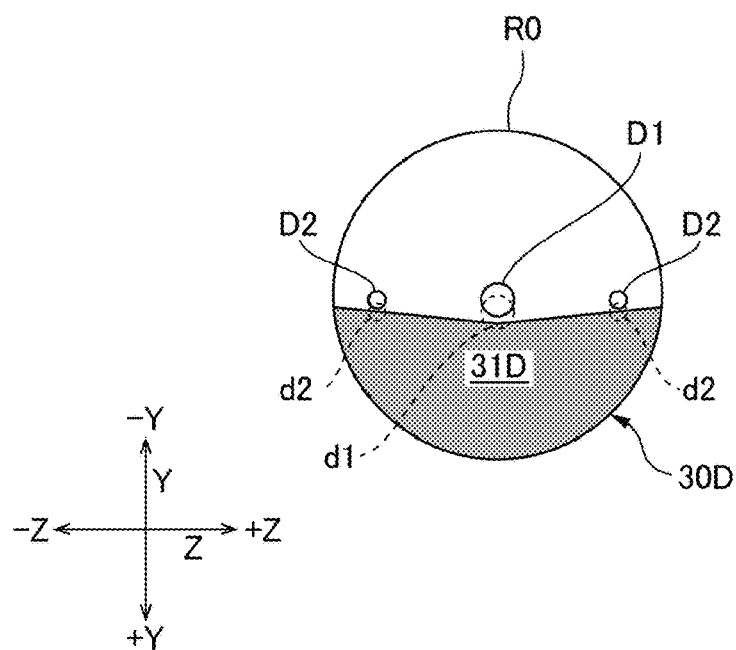
FIG. 8 is an explanatory view of a light-shielding area by a light-shielding mask of Modification 4.

In Embodiment 1, since the intermediate image has field curvature and is not formed on a flat plane, the beam diameter to acquire the same amount of light is different between the center part and the outer edge part in the effective image forming area R0. In Modifications 2 to 4, light-shielding areas 31B to 31D are set in consideration of such a difference in beam diameter. FIG. 6 is an explanatory view of the light-shielding area 31B by a light-shielding mask 30B of Modification 2. FIG. 7 is an explanatory view of the light-shielding area 31C by a light-shielding mask 30C of Modification 3. FIG. 8 is an explanatory view of the light-shielding area 31D by a light-shielding mask 30D of Modification 4. In FIGS. 6 to 8, circles denoted by the reference symbols D1, d1, D2, and d2 show beam diameters of the same amount of light. The beam diameters D1 and d1 are beam diameters at the center of the effective image forming area R0. The beam diameters D2 and d2 are beam diameters at outer edge parts of the effective image forming area R0. The beam diameters D1 and D2 indicated by solid lines are beam diameters of necessary light to form the intermediate image. The beam diameters d1 and d2 indicated by dashed lines are beam diameters of unwanted light.

As shown in FIG. 6, in Modification 2, the light-shielding area 31B is set, prioritizing preventing necessary light from being cut off when the beam diameter of the same amount of light increases as it goes toward the outer edge part of the effective image forming area R0. Therefore, in Modification 2, a boundary 32B of the light-shielding area 31B is shifted to a position corresponding to the beam diameters D1 and D2 of necessary light. Specifically, the boundary 32B is shifted to the side of the light-shielding area 31B according to the increase in the beam diameter. Thus, the same amount of light as in the case of not blocking light even at the outer edge part of the effective image forming area R0 enters. Therefore, there is little risk that the amount of light may be reduced by cutting off necessary light.

As shown in FIG. 7, in the light-shielding mask 30C of Modification 3, the light-shielding area 31C is set, prioritizing securely cutting off unwanted light when the beam diameter increases as it goes toward the outer edge part of the effective image forming area R0. Specifically, the beam diameter d1 of unwanted light at the center of the effective image forming area R0 is the smallest and the beam diameter d2 of unwanted light at the outer edge part of the effective image forming area R0 is the largest. Therefore, the boundary 32C is shifted to the side opposite to the light-shielding area 31C according to the increase in the beam diameter, so as to be able to block all unwanted light. In this way, the unwanted light can be securely cut off.

As shown in FIG. 8, in Modification 4, it is assumed that the beam diameter D1 at the center of the effective image forming area R0 is the largest and that the beam diameter D2 of the same amount of light decreases as it goes toward the outer edge part of the effective image forming area R0. In such a case, the light-shielding area 31D is set, prioritizing preventing necessary light from being cut off. This results in a shape such that the boundary 32D is largely shifted to the side of the light-shielding area 31D at the center of the effective image forming area R0. In this way, as in Modification 2, there is little risk that the amount of light may be reduced by cutting off necessary light.

Embodiment 2

Figure 9:
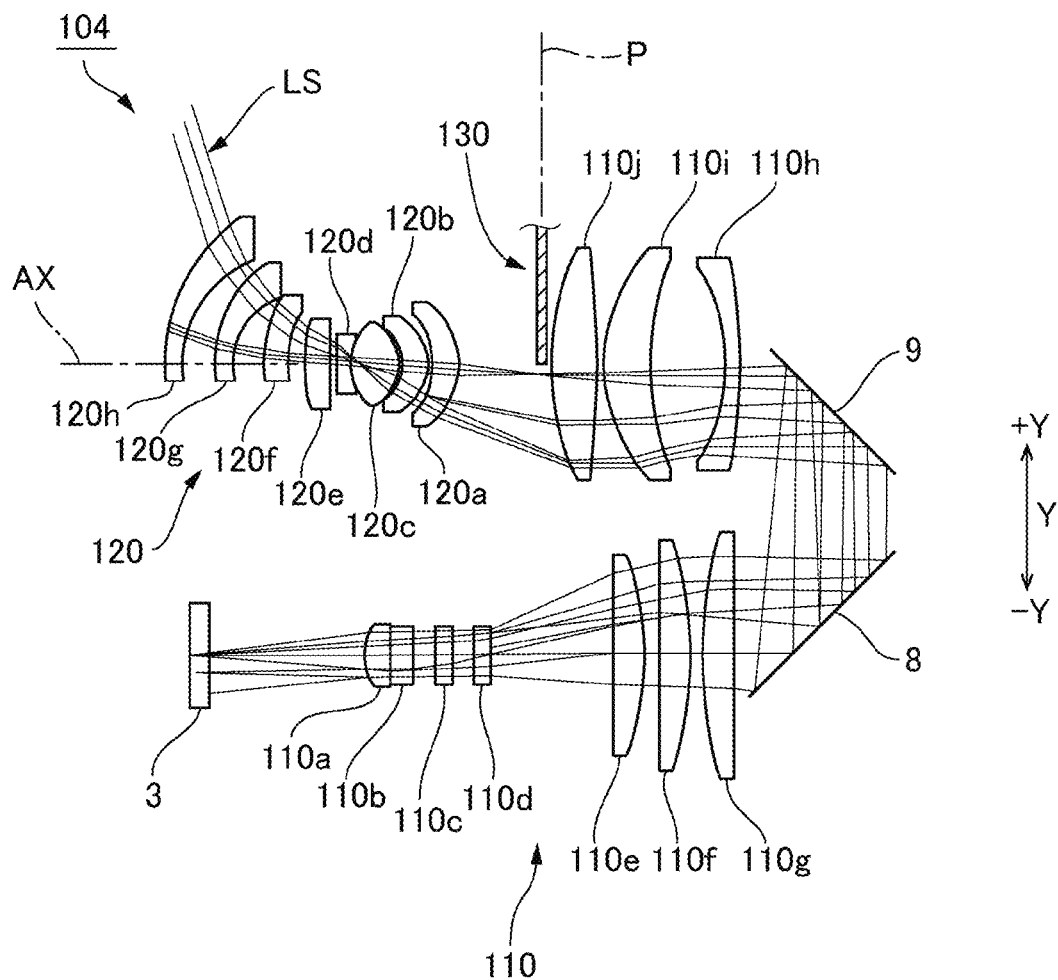
FIG. 9 is a cross-sectional configuration view of a projection system according to Embodiment 2.

FIG. 9 is a cross-sectional configuration view of a projection system 104 according to Embodiment 2. Hereinafter, only the differences between the projection system 104 of Embodiment 2 and that of Embodiment 1 will be described. While the optical path of the projection system 4 of Embodiment 1 is not bent, the projection system 104 of Embodiment 2 is provided with flat-surface mirrors 8 and 9 in the course of its optical path. The mirrors 8 and 9 change the direction of the optical path by 90 degrees each. Therefore, the exiting direction of the image light is changed by 180 degrees. Also, while the above configuration has flat-surface mirrors for changing direction, curved-surface lenses may be employed.

The projection system 104 of Embodiment 2 forms an intermediate image at a halfway point, as in Embodiment 1. The image forming position P of the intermediate image is situated to the exiting side of the mirrors 8 and 9. However, the image forming position P of the intermediate image is not limited to the exiting side of the mirrors 8 and 9 and may be between the mirrors 8 and 9 or to the incident side of the mirrors 8 and 9. The projection system 104 has a first optical system 110 having a lens group and the mirrors 8 and 9 situated to the incident side of the image forming position P of the intermediate image, a second optical system 120 having a lens group situated to the exiting side of the image forming position P of the intermediate image, and a light-shielding mask 130 arranged at the image forming position P.

As the lens group forming the first optical system 110, lenses 110a, 110b, 110c, 110d, 110e, 110f, 110g, 110h, 110i, and 110j are arranged in this order from the incident side to the exiting side of the image light. The mirrors 8 and 9 are arranged between the lens 110g and the lens 110h. As the lens group forming the second optical system 120, lenses 120a, 120b, 120c, 120d, 120e, 120f, 120g, and 120h are arranged in this order from the incident side to the exiting side of the intermediate image. The three lenses 120f, 120g, and 120h including the lens 120h situated on the most enlarging side (exiting side) are lenses whose parts are missing on the side where light does not pass in the shifted state (in this embodiment, −Y direction side), as in Embodiment 1.

In the projection system 104 of Embodiment 2, the light-shielding mask 130 is configured similarly to that in Embodiment 1. That is, the light-shielding mask 130 shields an area that does not overlap the intermediate image within the range of the circular effective image forming area R0 at the image forming position P of the intermediate image. Also, as the light-shielding mask 130, a plate-like component perpendicular to the optical axis AX can be used. As the specific shape of the light-shielding area by the light-shielding mask 130, various shapes as shown in FIGS. 4 to 8 can be employed. Thus, advantageous effects similar to those of Embodiment 1 and Modifications 1 to 4 can be achieved. Also, the invention can be applied to various projection systems which form an intermediate image at a halfway point.

Embodiment 3

Figure 10:
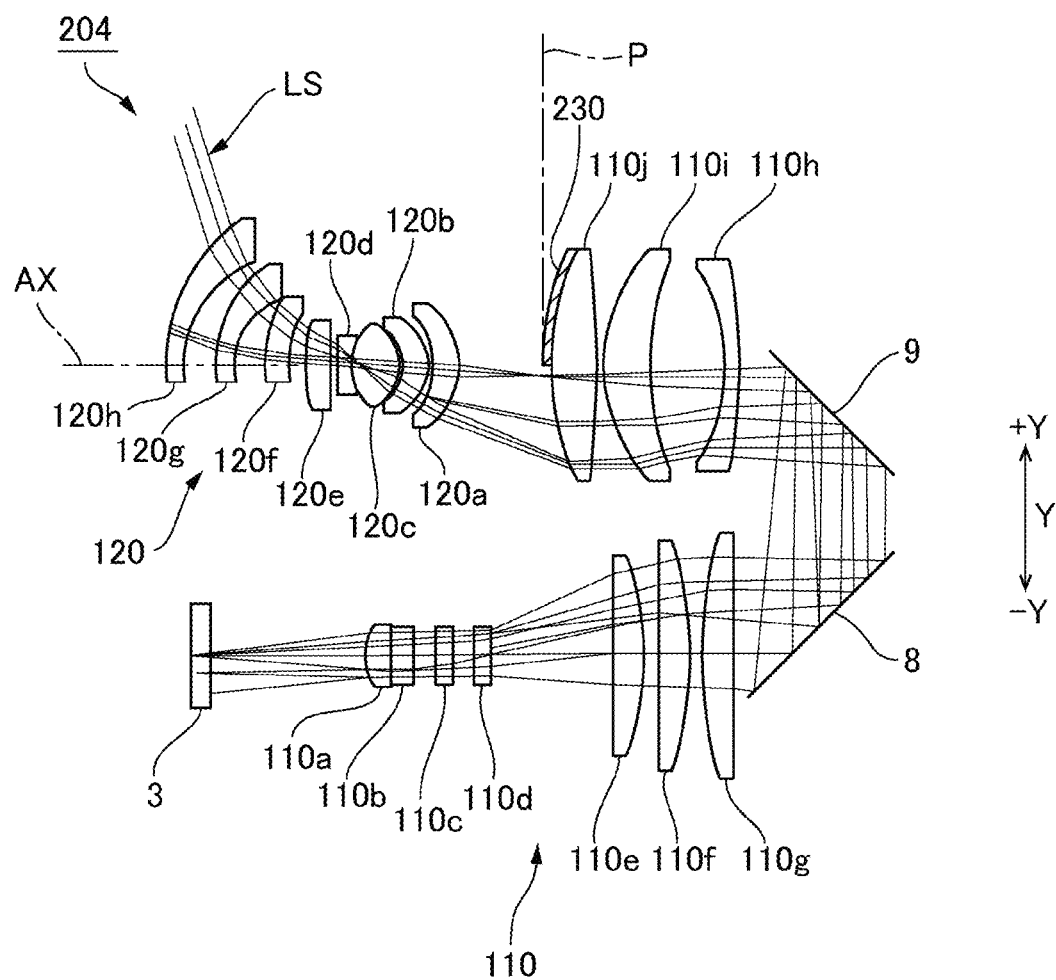
FIG. 10 is a cross-sectional configuration view of a projection system according to Embodiment 3.

FIG. 10 is a cross-sectional configuration view of a projection system 204 according to Embodiment 3. Hereinafter, only the differences between the projection system 204 of Embodiment 3 and those of Embodiments 1 and 2 will be described. The projection system 204 of Embodiment 3 has the same configuration as Embodiment 2 except for a light-shielding mask 230. In the projection system 204, the vicinity of the surface of the lens 110j situated on the nearest side to the image (exiting side) of the lens group forming the first optical system 110 forming the intermediate image is the image forming position P of the intermediate image. The light-shielding mask 230 provided in the projection system 204 of Embodiment 3 is made up of a light-shielding film formed on the surface of the lens 110j. The light-shielding mask 230 has a shape along the field curvature of the intermediate image. As the shape of the light-shielding area by the light-shielding mask 230, various shapes as shown in FIGS. 4 to 8 are set, as in Embodiments 1 and 2. Alternatively, since the light-shielding mask 230 has a shape that follows the field curvature, the boundary of the light-shielding area can be set in a shape along the contour of the intermediate image. In this way, unwanted light can be cut off more accurately and therefore the light image emitted from the projection system 204 can be sharpened. Thus, a reduction in the quality of the projected image can be restrained.

The entire disclosure of Japanese Patent Application No. 2016-108268, filed on May 31, 2016 is expressly incorporated by reference herein.

The invention claimed is:

1. A projection system which is removably installed in a projector having an image generation unit and on which light emitted from the image generation unit enters, the projection system comprising:
   a first optical system which forms an intermediate image;
   a light-shielding mask provided at an image forming position of the intermediate image; and
   a second optical system which projects the intermediate image as an enlarged image and has a plurality of lenses,
   wherein a light-shielding area by the light-shielding mask includes an area that does not overlap the intermediate image within a range of an effective image forming area centered on an optical axis of the first optical system at the image forming position,
   at least a lens disposed on a most enlarging side of the plurality of lenses of the second optical system has a substantially arcuate outer shape on one side in a direction orthogonal to an optical axis of the second optical system and has a substantially arcuate outer shape that is partly missing on the other side, and the intermediate image is formed at a position shifted from the center of the effective image forming area when substantially all of the light enters the lenses except the missing part of the lens disposed on the most enlarging side.

2. The projection system according to claim 1, wherein the light-shielding area includes an area on the side opposite to the side to which the intermediate image is shifted, within the range of the effective image forming area.

3. The projection system according to claim 2, wherein the side to which the intermediate image is shifted from the center of the effective image forming area at the image forming position is one side in a first direction orthogonal to the optical axis of the first optical system, and a direction orthogonal to the optical axis of the first optical system and the first direction is a second direction, and the light-shielding area is an area surrounding the other side in the first direction of the intermediate image and both sides in the second direction of the intermediate image, within the range of the effective image forming area.

4. A projector comprising:
an image generation unit;
the projection system according to claim 3, on which light emitted from the image generation unit enters; and
a projection system moving device which moves the projection system in a direction along a plane perpendicular to the optical axis of the first optical system.

5. A projector comprising:
an image generation unit;
the projection system according to claim 2, on which light emitted from the image generation unit enters; and
a projection system moving device which moves the projection system in a direction along a plane perpendicular to the optical axis of the first optical system.

6. The projection system according to claim 1, wherein the second optical system has at least one resin lens.

7. A projector comprising:
an image generation unit;
the projection system according to claim 6, on which light emitted from the image generation unit enters; and
a projection system moving device which moves the projection system in a direction along a plane perpendicular to the optical axis of the first optical system.

8. The projection system according to claim 1, wherein the light-shielding mask has a shape along a plane perpendicular to the optical axis of the first optical system.

9. A projector comprising:
an image generation unit;
the projection system according to claim 8, on which light emitted from the image generation unit enters; and
a projection system moving device which moves the projection system in a direction along a plane perpendicular to the optical axis of the first optical system.

10. The projection system according to claim 1, wherein the light-shielding mask has a shape that follows a field curvature of the intermediate image.

11. The projection system according to claim 10, wherein the light-shielding mask is a light-shielding film formed on a surface of a lens situated to the closest side to the intermediate image in the first optical system.

12. A projector comprising:
an image generation unit;
the projection system according to claim 11, on which light emitted from the image generation unit enters; and
a projection system moving device which moves the projection system in a direction along a plane perpendicular to the optical axis of the first optical system.

13. A projector comprising:
an image generation unit;
the projection system according to claim 10, on which light emitted from the image generation unit enters; and
a projection system moving device which moves the projection system in a direction along a plane perpendicular to the optical axis of the first optical system.

14. A projector comprising:
an image generation unit;
the projection system according to claim 1, on which light emitted from the image generation unit enters; and
a projection system moving device which moves the projection system in a direction along a plane perpendicular to the optical axis of the first optical system.

15. A projection system which is removably installed in a projector having an image generation unit and on which light emitted from the image generation unit enters, the projection system comprising:
a first optical system which forms an intermediate image;
a light-shielding mask provided at an image forming position of the intermediate image; and
a second optical system which projects the intermediate image as an enlarged image,
wherein the intermediate image formed at the image forming position is in an effective image forming area and is shifted from a center position of the effective image forming area, and
the light-shielding mask has a light-shielding area which shields light in a part of the effective image forming area and does not overlap the intermediate image.

16. A projector comprising:
an image generation unit;
the projection system according to claim 15, on which light emitted from the image generation unit enters; and
a projection system moving device which moves the projection system in a direction along a plane perpendicular to the optical axis of the first optical system.

* * * * *